United States Patent [19]
Keith

[11] Patent Number: 5,171,614
[45] Date of Patent: * Dec. 15, 1992

[54] METHOD OF FORMING AND USING SCULPTABLE ARTICLE

[75] Inventor: Barry Keith, Lebanon, Ohio

[73] Assignee: Sandee Craft, Inc., Lebanon, Ohio

[*] Notice: The portion of the term of this patent subsequent to Jan. 2, 2007 has been disclaimed.

[21] Appl. No.: 450,863

[22] Filed: Dec. 14, 1989

Related U.S. Application Data

[63] Continuation-in-part of Ser. No. 108,465, Oct. 15, 1987, Pat. No. 4,891,266.

[51] Int. Cl.⁵ .................. B32B 5/16; C08K 9/00; G09B 11/00
[52] U.S. Cl. ..................... 428/15; 156/284; 428/16; 428/323; 428/332; 428/542.2; 434/82
[58] Field of Search ............. 434/82; 156/62, 63, 156/284; 428/15, 16, 323, 331, 332, 404, 407, 542.2, 542.8, 454; 523/200, 205

[56] References Cited

U.S. PATENT DOCUMENTS

| | | | |
|---|---|---|---|
| 1,446,941 | 2/1923 | Smith | 428/3 X |
| 2,214,126 | 9/1940 | Engel | 428/542.2 |
| 3,661,554 | 5/1972 | Whitaker | 51/295 |
| 3,821,155 | 6/1974 | Kloos | 428/404 X |
| 3,864,101 | 2/1975 | Charvat | 51/295 X |
| 3,883,456 | 5/1975 | Finck | 428/542.2 X |
| 4,035,162 | 7/1977 | Brothers et al. | 51/298 |
| 4,078,340 | 3/1978 | Klecker et al. | 51/295 |
| 4,221,572 | 9/1980 | Torimae et al. | 51/298 |
| 4,350,497 | 9/1982 | Ogman | 51/296 |
| 4,433,070 | 2/1984 | Ross et al. | 428/15 X |
| 4,578,131 | 3/1986 | Hawkins, Jr. | 156/62 |
| 4,740,423 | 4/1988 | Kadokura et al. | 428/404 X |
| 4,891,266 | 1/1990 | Keith | 428/542.8 X |

FOREIGN PATENT DOCUMENTS

| | | | |
|---|---|---|---|
| 0111083 | 7/1983 | Japan | 428/454 |
| 1295590 | 12/1986 | Japan | 428/454 |

*Primary Examiner*—Henry F. Epstein
*Attorney, Agent, or Firm*—Wood, Herron & Evans

[57] ABSTRACT

A method of forming a dry, three dimensional block of sculptable material preferably involves the steps of painting the grains of a granular material, allowing the painted grains to dry, mixing a water resistant binder with the painted grains to form a slurry and hardening the slurry to form the block. The amount of binder added is selected to provide a block with a hardness between about 0.25 and 4.0 on the Mohs scale. The formed block has a wide variety of uses, including but not limited to use as a sculptable article, a sanding object, a sign or as a paving stone.

34 Claims, 1 Drawing Sheet

METHOD OF FORMING AND USING SCULPTABLE ARTICLE

This application is a continuation-in-part application of application Ser. No. 108,465, filed on Oct. 15, 1987 now U.S. Pat. No. 4,891,266.

FIELD OF THE INVENTION

This invention relates to artificial sculpting material and to the production and use of such material.

BACKGROUND OF THE INVENTION

Education, especially in elementary forms, is undertaken not so much to make the student an expert in the field as to give the student sufficient proficiency to understand the use of the technique, whether in the so-called useful arts of arithmetic, writing, manual training, physical training, and others, or in the arts of painting, sculpture, poetry, dance, and others, which are sometimes referred to as decorative, or fine, arts. Among the fine arts, two-dimensional graphic expression has been assisted by the availability of a wide variety of materials suitable for use by students of every age and level of expertise. Sculpture, in contrast, has not been so fortunate. Clay, from which three-dimensional forms can be produced, is relatively easily procured by students at all levels, but solid stone in a form that can be carved by even the youngest student is not. Clay allows the correction of mistakes and changing of thought, since clay sculptures are produced by adding soft clay to whatever is already there. Stone, which is carved only by removal of material that, once gone, cannot be replaced, cannot be corrected nearly as easily. There is a discipline in stone unmatched by the rectifiable modeling permitted by clay. However, clay is much used by modern sculptors, even those of great artistic ability, who employ assistants who are less creative but are sufficiently manually proficient to produce a final work of art in stone according to the clay prototype created by the artist. It has been said that it may be this very lack of experience in working with stone that makes it difficult for the modern sculptor to become a thorough master of the art, thinking naturally in stone rather than in clay.

A characteristic of a stone sculpture, equal in importance to the disciplines of forethought and accuracy imposed on the sculptor, is the permanence of the finished work of art. No gentle force, whether of impact, wind, or water, should be able to make an easily observable effect upon it in a measurable span of time.

THE PRIOR ART

Stones have been synthesized for many purposes, one common one being for use as grinding stones, as described in U.S. Pat. Nos. 3,661,544 to Whitaker; U.S. Pat. No. 3,864,101 to Charvat; U.S. Pat. No. 4,035,162 to Brothers et al.; and U.S. Pat. No. 4,350,497 to Ogman. Other forms of abrasive material are described in U.S. Pat. Nos. 4,078,340 to Klecker et al. and U.S. Pat. No. 4,221,572 to Torimae et al. In none of these is the final material intended to be sculpted into some desired shape. Quite the contrary, grinding stones do the shaping of other material, and it is the essence of grinding stones to hold together while removing material from work pieces.

Another prior material synthesized from sand and resin is that used in molds in which molten metal is cast. In such materials, the resins is used to hold the grains of sand together securely enough to allow complex molds to be formed, which can be used directly in casting complex metal pieces that require less machining to finish than would be required if the machining had to be done on more crudely cast shapes. However, the models formed for casting are intended to be broken up as the cast piece is removed from the mold after it has solidified. There is never any intention that the mixture of resin and sand be sculpted beyond very minor touching up of the mold to correct small inaccuracies, such as visible parting lines and the like. In particular, there is no need to color the sand, either in a single color or in intermingled colors, nor to make it attractive for its own sake as a work of art; it is completely utilitarian.

SUMMARY OF THE INVENTION

In accordance with the present invention, sculpting material is produced by mixing granular material with a suitable paint to color the individual grains. The grains thus colored are dried and either maintained in or returned to granular form. In some cases, the process may be repeated one or more times to increase the intensity of the color. The granular material is dried after each application of a layer of paint, and the dried, colored granular material can be stored for future use, or it can be used immediately to form a sculpting stone or stones.

The formulation of sculpting stones from the colored granular material is accomplished by adding binding materials similar to those used in the metal casting industry to form foundry molds. However, the configuration of sculpting stone and certain criteria of its final use dictate limitations that are not relevant to the metal casting industry. For one thing, the essence of stone intended to be used for sculpting is that it be carvable so the pieces of controllable size, down to the most minute, can be removed from an initial block at the will of the sculptor; it would be most undesirable to have large chunks break off when the sculptor only wanted to remove a tiny bit. Foundry molds for metal casting are not sculpted but are used in the shape in which they are molded. Thus, it is not necessary that they be carvable. After metal has been cast in and around them, they are broken down into the granular state from which they started.

For another thing, foundry molds are not expected to last long. The casting process is carried out right away. Thus, in the case of such molds, solubility in water may even be helpful, or at least not harmful, in removing the binding material. In sculpting stone, on the contrary, it is important that the binding material not be affected by water, because that would make the sculpture susceptible to being defaced and even eroded back to its original granular state. Sculptures of such material would not be enduring, as stone sculptures are expected to be.

In addition, some binding materials used in foundry mold-making have a most unpleasant odor. This can be dealt with by the powerful ventilation system in a foundry, but working closely on a malodorous sculpting stone to shape it precisely in a moderately ventilated classroom or art studio is unpleasant. Thus, the binding material must be resistant to water and must not have a bad odor.

I have found that alkyd resins, such as the 18-00 series produced by Delta Resins & Refractories, Inc. of Milwaukee, Wisc., are quite suitable. I mix the resin with the previously colored granular material to form a slurry with which I then mix a suitable coreactant, such as Delta's 23-217 coreactant. The time within which the materials can be stirred together before they begin to set is determined by the catalyst used and the amount of the catalyst. Delta produces a catalyst identified as their 1718-X catalyst, which may be mixed with the resin, initially, or may be sold separately to be added later. Adding the catalyst later allows the drying time of the mixture to be controlled according to the nature of the sculpting stone being produced. Depending on the desired end product, I may pour it into one or more molds to solidify. If the product is one that is formed as a relatively large layer, it may be left to dry in the container in which it is mixed. After the slurry has been poured into molds, if that is to be done, the molds are vibrated to release air bubbles and settle the mixture. If the slurry is not poured out of the mixing container, that container is vibrated. The slurry is then allowed to solidify, after which it may be cut into pieces ready to be sculpted.

The invention will be described hereinafter in conjunction with the accompanying drawings.

DETAILED DESCRIPTION OF THE INVENTION

Figure 1:
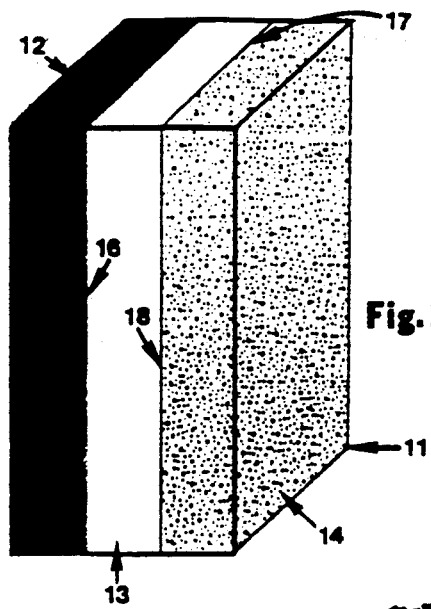
FIG. 1 shows a block of sculpting stone according to this invention.

A block of sculpting stone II in FIG. 1 is formed principally of a granular material, such as sand, although other granular materials may be used instead. The fineness of the grains determines how smooth the surface of a sculpture made from the stone II can be. The higher the grain fineness number (sometimes simply stated as GFN), the smaller the grains and, therefore, the smoother the surface. The grain fineness number is the approximate number of mesh openings per inch of a sieve that would just pass a sample of granular material if the grins in the sample were of uniform size. The American Society for Testing Materials (A.S.T.M.) has established mesh numbers from 3.5, corresponding to sieve aperture diameters of 7.93 mm, to 400, corresponding to sieve aperture diameters of 0.037 mm. Thus, numerically the mesh numbers are inversely proportional to the size of the largest grain that can pass through them. While granular material having large grains that will only pass through sieves with mesh numbers of 6 or below can be used to make sculpting stones, especially for large sculptures to be mounted outdoors, I have found that smaller grain sizes are more universally satisfactory, such as grains that will pass through sieves having mesh numbers in the range from about 40 to 180. Preferably, the granular material corresponds to mesh numbers in the range from about 100 to 140, with a mesh number close to 120 being the optimum size.

It is well known to select sculpting material, such as marble, according to its color, but the range of colors is somewhat limited. This invention, on the other hand, makes it possible to obtain sculpting material that has any one or more of a wide variety of colors. Such coloring extends relatively uniformly through the entire sculpting stone and is achieved by applying paint to the granular material before forming it into a block. The paint I have found to be most satisfactory is an oil-based alkyd, but other paints, such as latex, acrylic lacquer, acrylic enamel, acrylic urethane, polyurethane enamel, epoxy marine paint, and others may be used instead. In the case of alkyd paint, an amount between about ¼ lb. and 5 lbs. should be mixed with each 100 lbs. of sand, although the ratio is preferably not more than about 2½ lbs. of alkyd paint to 100 lbs. of sand. The finer the grains of sand, the larger the surface area of a given weight of sand, and, thus, the larger the quantity of paint required within the foregoing ratio. If it is not known that the grains of sand are of the proper size, the sand should be screened before the paint is added to it, partly to provide uniformity of the end product and partly to determine the amount of paint to use.

After mixing the paint and sand together, the painted sand should be spread out to dry. It is important that the painted sand not only be dry but be in particulate form before it is used in the next step of the process, and, accordingly, I have found it desirable to rescreen the dried material through a sieve of the same number as the first screening. The material may have to be broken up to return it to particulate form before rescreening it. Due to the increase in diameter of the grains because of the paint on them, about two or three percent of the grains will be lost in the rescreening. If a more intense color is desired, the painted grains may be mixed with more paint, dried, and rescreened. The process can be repeated again, although one or two repetitions should usually be enough. The painted, dry sand can be stored in a closed container or used without delay in forming sculpting stone in accordance with the rest of the procedure, as described hereinafter.

The block 11 shown in FIG. 1 may be considered typical of one type of sculpting stone formed by this inventive method. This particular embodiment has three distinct layers of separate colors, but a dry, three dimensional sculptable block according to the invention can be made with one single painted color, the natural color of the grain, or any one of virtually an infinite number of different color arrangements. In FIG. 1, the color is uniform throughout each layer since there is a layer of paint on virtually every grain, and any article sculpted from block 11 will display the bands of colors of the layers 12–14 across the carved surfaces. The resulting article will have an added quality of interest over the same article made of monochromatic sand, and may particularly intrigue new students of the art, although monochromatic painted sand is perfectly satisfactory for many sculptures and would be less expensive. The multi-colored sand, though, is likely to lead to the desired result of stimulating new students particularly young ones, to work harder.

The layers 12–14 in this embodiment can be made to differ only in color while remaining of equal hardness to each other. Thus, the sculptor, whether experienced or not, will not be forced to use different tools on parts of the sculpture that fall in different layers, nor will there be any need to apply different pressure to the tools in going from layer to layer. Uniformity of carvability is usually a desirable characteristic, although there may be occasions when the layers should be formed so that they will have different hardnesses, as will be described hereinafter.

The grains in each of the layers, e.g., layer 12, are bound together by a matrix of a suitable resin with which the painted granular material is mixed. The mixture is initially a slurry, which hardens into a solid layer in due time according to the hardening, or catalytic drying, agent used.

The layer may be anywhere from a fraction of an inch to many inches thick, and its width and length may also vary from less than an inch to many inches. Depending on the expected end use of the layer, after it hardens, it may be removed from the container in which it is formed and cut into smaller pieces before being turned over to a sculptor, or it may be left as one piece. If it is to be combined with other layers 13 and 14, its surface 16 may be smoothed into a flat plane, or the first layer may be left in its as-formed state, and the second layer may be formed by pouring a second slurry directly on its exposed surface 16. The layer 14 may be formed in the same way on the surface 17 of the layer 13, or it may be formed as an entirely separate, solid layer. In the latter case, the solid layers 12 and 14 may be supported with their surfaces 16 and 18 suitably spaced apart and juxtaposed to each other, and the slurry that will form the layer 13 poured between them. In any case, the layers 12-14 may be made of identical constituents (except for the color of the paint) so that the final block 11 will have uniform sculpting qualities throughout, unlike some natural materials. Furthermore, the resin in the slurry at each interface between the layers bonds them to each other to form a single block 11 that holds together uniformly. This is another aspect in which the artificial sculpting stone of this invention differs from, and is an improvement over, some natural materials that have weak internal surfaces that may crack, even after much work has been done on them by the sculptor.

After the different colored slurries are layered, but before the first layer has dried, the single mass of material may be reformed or reworked with an additional object or the fingers to rearrange the separate regions along contours. The desired effect of this reworking is to alter the otherwise parallel boundaries to give a natural, uneven sedimentary or contoured look.

Permanence, at least in the absence of deliberate destruction, is one of the most desired characteristics of a sculpture, whether it be made by a professional artist or a child just learning the techniques. The most likely source of insidious destruction of a sculpture carved of any form of stone is the atmosphere, or, more properly, some of the components in the atmosphere. The component likely to do the greatest damage in the shortest time is water vapor, even in the case of a sculpture kept indoors. Consequently, it is desirable to use materials that are as insoluble in water as possible, provided, of course, that they are otherwise satisfactory. I have found that an alkyd binder resin sold by Delta Resins & Refractories, Inc., as their 18-00 and 18-001 series works very well. Such material is intended to be added to sand to form molds (and cores) for use in casting metal. The resin is a liquid and, when mixed with sand, forms a slurry that is then poured into a master mold. There the slurry hardens so that the mold thus formed will not crumble when, or before, molten metal is poured on or into it. However, such molds are not permanent articles. They are intended to be used only once and are likely to be broken, frequently deliberately, in separating them from the solidified metal or, if not then, shortly afterward, so that the sand in them can be used to form a new mold.

Along with the alkyd resin, foundries use Delta's coreactant 23-217 to harden the resin. The coreactant contributes to the polymerization of the resin, and the degree of hardness can be controlled. In the case of the block 11, such control of hardness may be used to make one or more of the layers 12-14 harder than the other layer or layers or to make the whole block 11 harder or softer, by controlling the amount of coreactant used in every layer. The amount of resin used is about 0.25% to about 5% of the weight of the sand, depending on the type of sand, the grain size, and the amount and type of paint used. The alkyd paint takes the place of some of the alkyd resin that would otherwise be required, partly by filling up some of the interstices in the grains and leaving less space to be filled up by the resin. The amount of the coreactant is about 15% to about 22% of the amount, by weight, of the resin.

The hardness of a compound material, such as the material being described, in which the grain, if of sand, are extremely hard and the resinous matrix material is much more frangible, cannot be easily placed on the Mohs scale. However, it is desirable that the block 11 be easy to carve, especially if it is to be used by a child. In comparison to natural materials, the sculpting stone, as a whole, should be less than about 4.0 on the Mohs scale and preferably less than about 2.0. At the softest, it may be desirable that it be carvable by a stiff-bristled brush, which would place the lower limit at about 0.5 on the Mohs scale.

A further characteristic of this material is that the smallest increment removed in carving it be approximately one grain, and that the material not be separated in flakes or by spalling. It should not have any stickiness resembling tar.

The coreactant is not usually added to the mixture of sand simultaneously with the resin, although it can be, if the mixing action is sufficiently vigorous. Typically, the mixture of sand and resin should be mulled for at least about two minutes before the coreactant is added, and I have found that mulling the mixture for about five minutes yields a very satisfactory product. After the coreactant has been added, the mixture should be mulled for another short period, but care should be taken not to heat up the mixture by excessive mulling, because such heating could accelerate polymerization of the resin.

Figure 2:
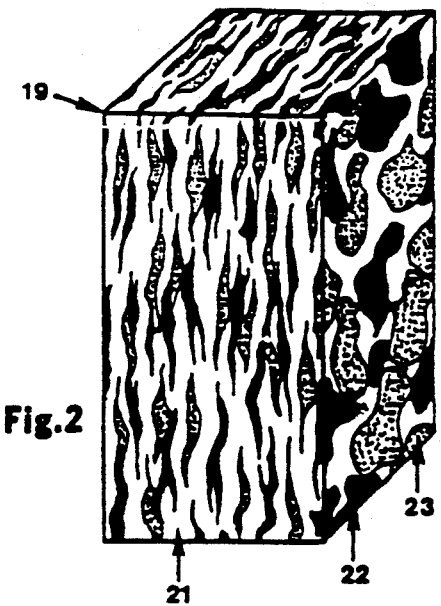
FIG. 2 shows a marbleized form of sculpting stone according to this invention.

FIG. 2 shows a block 19 formed by combining granular material colored by three different paint colors, but instead of having the colors separated from each other in flat layers, as in FIG. 1, the colored materials 21-23 are intermingled with each other. The intermingling is done carefully so that each small region is visibly distinct and has relatively sharp boundaries. This is achieved by forming, at the same time, three different slurries of granular material colored by three different paint colors and mixing all three together while all are still in the liquid state. The mixing must not stir the three colors so intimately together that the block 19 will appear to have just one color, which is the additive result of the three color components. The colors should be kept separate so that the visual effect is that the block 19 somewhat resembles marble, with a main region 21 that appears white in this figure and other regions 22 and 23 colored by two different paints. It is not necessary to mix these colors together; attractive results can also be achieved by mixing two or more different colored regions, as long as they remain visibly separate. As in FIG. 1, the physical characteristics may be kept identical so that, when the block 19 is carved, there is no difference in the way the three regions react to carving tools.

Due to the fact that care must be exercised in mixing the materials to produce the marbleized effect, it is necessary that none of the slurries harden too soon. Delta produces a resin, identified as 18-94 in their 18-00 series, that can be worked, or stirred, for 120 minutes, and using that resin allows the three slurries to be relatively gently stirred together to achieve good intermingling while retaining sharp boundaries. The Delta resin 18-94 has a limited amount of a catalytic curing, or drying agent, such as Delta's 1718-X catalyst in it to allow a long stirring, or working, time.

The difference between the block 11 in FIG. 1 and the block 19 in FIG. 2 is that the block 11 can be formed in a small mold, or recess, having the size of the block to be sold to customers, or it an be formed as a large slab and cut into small blocks of the size to be sold. The marbleizing effect in FIG. 2 does not reach to the edges of the mold in which the marbleized material is formed. Preferably, it is formed as a larger piece than is to be sold, and it is cut into a smaller piece, or pieces, not including the edge portions.

After the coreactant has been put into the slurry, and any necessary working done, the slurry must be poured into a mold or molds, unless it is to harden in the container in which it is formed. Then, the mold or container, or the whole table on which the mold (or molds) or container is located is vibrated for about one to 30 seconds to settle the slurry and work out any gas entrapped therein. If the slurry is in a mold, it is desirable to put in more than enough to fill the mold and then to vibrate it until the top of the slurry is level with the top of the mold. Then a cap is placed on the mold to cover the mold and the slurry, and the whole thing is vibrated for one to about 60 seconds to achieve the desired compaction. In order to get the material out of a mold, a release agent is used.

Figure 3:
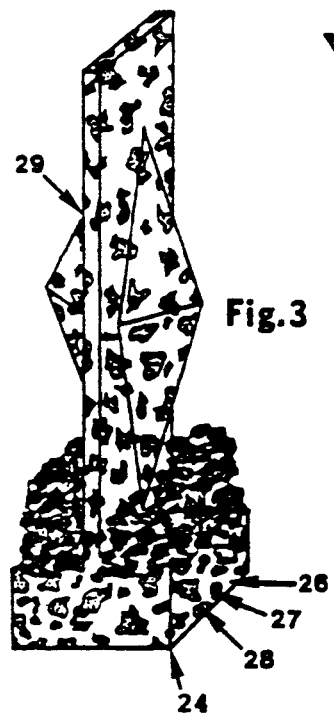
FIG. 3 shows yet another form of sculpting stone made according to this invention and partially carved into an abstract work of art.

FIG. 3 shows a partially sculpted block 24 of another type of material. As in the block 11 in FIG. 1 and the block 19 in FIG. 2, the block 24 is made of granular material held together by a resin binder. In FIG. 3, the main material 26 of which the block 24 is formed is made of granular material coated with paint of one color, and chips of preformed material 27 and 28 are dispersed throughout the materials 26. The chips are made in the same way as the layer 12 in FIG. 1, except for being colored differently. Once two layers are formed and hardened, they are broken up into small chips 27 and 28, which are stirred into the slurry of which the main material 26 is formed. The material 26 solidifies around the chips, forming a monolithic block. Since the chips have the same physical constitution as the main material, the entire block 24 responds to carving as if there were only one material. It can be seen in the drawing that the smooth, sculpted surfaces of the abstract FIG. 29 pass through the chips 27 and 28 as if they were the same as the material 26, but the chips add visual interest to the sculpture.

Figure 4:
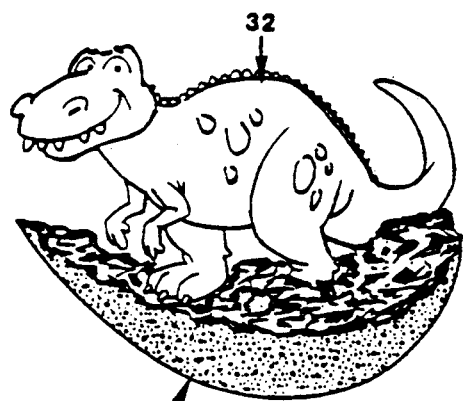
FIG. 4 shows a partially sculpted block in which a finished form is encased, in accordance with this invention.

FIG. 4 shows another partially carved figure. In this case, a block 31 of granular material held together by a resin binder has a preformed figure or object embedded therein. The object is embedded in the slurry prior to hardening, and may be made of plastic or any other type of material such as stone, glass, wood and other manmade and natural materials that cannot be carved or, at least, cannot be carved as easily as the block 31. Preferably, the embedded object has a different hardness than the rest of the block. The enclosed or embedded object in the block 31 serves as an introductory device that will interest small children in sculpting. In this instance, the block is softer than in the previous embodiments and can even be so soft that it can be carved by brushing away the granular material with a stiff-bristled brush. The brush, or even an ordinary, hard carving tool, would not affect the dinosaur, and the child would become interested in seeing the appearance of a recognizable shape by thus sculpting the block 31. It is to be understood that, prior to the child's efforts, the block 31 was a parallelepiped, like the block 11 in FIG. 1, and the dinosaur 32 was completely hidden within it.

Figure 5:
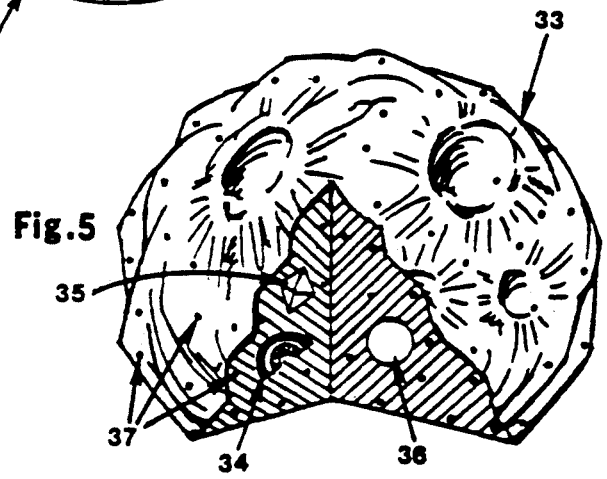
FIG. 5 shows a sculpting stone of random shape containing other sculpting stone solids and other materials according to this invention.

FIG. 5 shows a randomly shaped piece of sculpting stone 33 similar to the blocks 11, 19, and 24, except that the piece 33 has geometrical pieces 34-36 in it. These represent, respectively, segments of multi-layered, multi-colored cylinders 34 of sculpting stone; crystals or diamonds or gemstones 35; and thin discs 36. In addition, the stone 35 has flakes, or pieces 37, of glittering material throughout it and on its surface to make it more interesting, and the whole stone 33 may be suffused with a chemical that emits a pleasant fragrance. The chemical and any of the additive materials 34-37 can be incorporated in any of the sculpting stones now in FIGS. 1-4; there is no limit in this invention to such modifications.

While a preferred embodiment of the invention has been described, it is to be understood that this inventive method can provide advantageous use in a wide variety of other applications. For instance, the dry three dimensional block, with or without paint, could be used as a hand held sander, or abrader, thereby alleviating common problems associated with sandpaper, such as wrinkling.

Additionally, with respect to layering two different colors of slurry in a mold, selected portions of one of the colors can be sanded or etched away with the aid of a mask in order to expose the other underlying color. The shape of the selected portions can be chosen to form letters for ultimate use as a sign, or a design or pattern for use as a paving stone, or any number of other uses. Because the dry, three dimensional block formed according to this inventive method is water resistant, but not water impermeable, it may be desirable to apply a final, water impermeable, protective coating to the finished product, particularly if the finished product will be placed outdoors. Any one of a number of different commercially available polyurethane coatings could be used, such as Sherwin Williams Polyurethane Clear Varnish. Preferably, the protective coating is applied by spraying.

Other modifications and advantages will become readily apparent to one of ordinary skill in the art, without departing from the scope of this invention, and applicant intends to be bound only by the claims appended hereto.

What is claimed is:

1. A method of making a dry, three dimensional sculptable solid comprising the steps of:
   (a) substantially coating the grains of granular material with paint;
   (b) drying the paint-coated grains;

(c) mixing the dried grains with a water resistant binder to form a slurry; and (d) drying the slurry to form the sculptable solid having a hardness between about 0.25 and about 4.0 on the Moh's scale.

2. The method of claim 1 comprising the additional step of screening the dried, paint-covered grains to select those that are smaller than a predetermined size.

3. The method of claim 1 wherein the paint is an alkyd paint.

4. The method of claim 1 wherein the water resistant binder is an alkyd resin.

5. The method of claim 1 in which the ratio of the weight of the paint to the weight of the granular material is between about ¼ lb. and about 3 lbs. of paint to about 100 lbs. of granular material.

6. The method of claim 1 and further comprising the steps of:

(a) additionally coating the dried, paint-coated grains again with paint to form a thicker coating of paint thereon; and (b) drying the multiply-coated grains after application of additional coating of paint thereon.

7. The method of claim 6 and further comprising:

screening the dried grains to select those smaller than a predetermined size after application of each additional coating of paint thereon.

8. The method of claim 1 in which the water resistant binder includes a quantity of a catalytic drying agent sufficient to dry the slurry in less than about two hours.

9. The method of claim 1 and further comprising the step of:

adding a sufficient quantity of a catalytic drying agent to dry the slurry in less than about two hours.

10. The method of claim 1 and further comprising the step of:

vibrating the slurry prior to drying in order to free air bubbles entrapped therein.

11. The method of claim 1 and further comprising the step of:

pouring the slurry into a mold to form a sculptable solid of predetermined shape.

12. The method of claim 11 and further comprising the step of:

vibrating the slurry prior to drying in order to free air bubbles entrapped therein.

13. The method of claim 11 and further comprising the steps of:

performing steps (a) through (c) with two different colors of paint to achieve two different colored slurries;

pouring one of said different colored slurries into said mold on top of the other of said different colored slurries to form a sculptable solid of two layered regions of different colors, each said region corresponding in color to one of the slurries, said regions residing generally in a side-by-side relationship and having a substantially planar boundary therebetween.

14. The method of claim 13 and further comprising the steps of:

etching away selected portions of one of said regions to expose the other of said regions residing thereneath.

15. The method of claim 14 wherein said etching step is performed with a mask covering unselected portions of said etched region.

16. The method of claim 14 wherein the exposed portions of the other of said regions forms the letters of a sign.

17. The method of claim 14 and further comprising the steps of:

applying a protective coating to said dried, etched mass to render said mass water impermeable.

18. The method of claim 13 wherein the subsequently poured slurry is poured onto the initially poured slurry before said initially poured slurry is dried, and further comprising the step of:

contouring said layered slurries to render said boundary non-planar.

19. The method of claim 13 and further comprising the steps of:

alternating additional layers of said two different colored slurries to form a sculptable block having a selected multiple number of layered regions with substantially parallel boundaries.

20. The method of claim 19 wherein said additionally poured slurry layers are poured onto previously poured slurries before the initially poured slurry has dried, and further comprising the steps of:

contouring said layered slurries to render said boundaries non-planar, thereby to produce a natural sedimentary effect.

embedding a three dimensional object in said slurry prior to drying, said object having a hardness different from that of said dried sculptable block.

21. The method of claim 1 and further comprising the steps of:

performing steps (a) through (c) with two different colors of paint to achieve two difference colors of slurry;

mixing the two different colors slurries together to form a single mass with visibly separate regions of said two different colors and allowing said single mixed mass to dry.

22. The method of claim 1 and further comprising the step of:

23. A process of making a dry, three dimensional sculptable article comprising the steps of:

(a) coating grains of a granular material with an alkyd paint;

(b) drying the painted grains;

(c) mixing the dried painted grains with an alkyd resin binder to form a slurry; and (d) hardening the slurry into a block of sculptable material having a hardness of between about 0.25 and 4.0 on the Mohs scale.

24. A process of making a dry, three dimensional article comprising the steps of:

mixing the grains of a granular material with a water resistant binder to form a slurry; and hardening the slurry into a block of dry, three dimensional material having a hardness between about 0.25 and 4.0 on the Mohs scale.

25. The process of claim 24 and further comprising the step of:

coating, prior to said mixing and hardening steps, said grains with a paint; and drying said painted grains prior to said mixing and hardening steps.

26. A method of using a dry, three dimensional article formed according to the process of claim 25, comprising the step of:

abrading a surface with said block.

27. The process of claim 24 and further comprising the step of:
  mixing chips of another material into said slurry prior to said hardening step.

28. The process of claim 24 and further comprising the step of:
  adding a coreactant to said binder.

29. The process of claim 28 wherein said coreactant is added to said binder after said mixing step.

30. The process of claim 29 and further comprising the steps of:
  mulling said slurry both before and after said adding step.

31. The process of claim 24 and further comprising the step of:
  embedding a three dimensional article in said slurry prior to drying.

32. The process of claim 31 and further comprising the step of:
  sculpting some of said grains from said block to at least partially reveal said embedded object.

33. The process of claim 24 and further comprising the step of:
  sculpting said block to a desired shape.

34. A dry, three dimensional sculptable article formed by the method of:
  mixing the grains of a granular material with a water resistant binder to form a slurry; and
  hardening the slurry into a block of dry, three dimensional material having a hardness between about 0.25 and 4.0 on the Mohs scale.

* * * * *

UNITED STATES PATENT AND TRADEMARK OFFICE
CERTIFICATE OF CORRECTION

PATENT NO.  : 5,171,614
DATED       : December 15, 1992
INVENTOR(S) : Barry Keith It is certified that error appears in the above-identified patent and that said Letters Patent is hereby corrected as shown below:

Column 10, Lines 27-30 should be deleted.

Column 10, after line 40, in Claim 22, add "embedding a three dimensional object in said slurry prior to drying, said object having a hardness different from that of said dried sculptable block."

Signed and Sealed this

Fifteenth Day of March, 1994

Attest:

BRUCE LEHMAN

*Attesting Officer*          *Commissioner of Patents and Trademarks*